(12) United States Patent
Torocsik et al.

(10) Patent No.: US 10,399,896 B2
(45) Date of Patent: Sep. 3, 2019

(54) METHOD FOR PRODUCTION OF ADDITIVES ENHANCING WATER TIGHTNESS OF BUILDING MATERIALS

(71) Applicants: Ferenc Torocsik, Oroshaza (HU); Turki Muhammad S Basharahil, Al Mukkaramah (SA); Bandar Turki M Basharahil, Al Mukkaramah (SA)

(72) Inventors: Tunde Torocsik, Oroshaza (HU); Ferenc Torocsik, Oroshaza (HU); Dora Torocsik, Oroshaza (HU)

( * ) Notice: Subject to any disclaimer, the term of this patent is extended or adjusted under 35 U.S.C. 154(b) by 264 days.

(21) Appl. No.: 15/325,566

(22) PCT Filed: Oct. 18, 2014

(86) PCT No.: PCT/HU2014/000095
§ 371 (c)(1),
(2) Date: Jan. 11, 2017

(87) PCT Pub. No.: WO2016/059442
PCT Pub. Date: Apr. 21, 2016

(65) Prior Publication Data
US 2017/0166479 A1    Jun. 15, 2017

(51) Int. Cl.
*C04B 2/00* (2006.01)
*C04B 2/06* (2006.01)
*C04B 28/02* (2006.01)
*B01F 3/12* (2006.01)
*B01F 5/20* (2006.01)
(Continued)

(52) U.S. Cl.
CPC .............. *C04B 2/06* (2013.01); *B01F 3/1214* (2013.01); *B01F 3/1221* (2013.01); *B01F 5/20* (2013.01); *B01F 7/00933* (2013.01); *B01F 7/18* (2013.01); *C04B 24/045* (2013.01); *C04B 28/02* (2013.01); *B01F 2215/0047* (2013.01); *C04B 2103/65* (2013.01)

(58) Field of Classification Search
None
See application file for complete search history.

(56) References Cited

U.S. PATENT DOCUMENTS

2007/0175366 A1 *  8/2007  Balogh  ................... C04B 28/02
106/728

FOREIGN PATENT DOCUMENTS

EP      1892219 A1 *  2/2008  ......... C01G 23/0532
EP      2574636 A1 *  4/2013  ......... C04B 24/2647
(Continued)

*Primary Examiner* — James E McDonough

(57) ABSTRACT

The invention relates to an apparatus and a method for production of additives enhancing water tightness of structural and binding building materials. The method comprises the steps of: preparing a hydrophobing agent by esterifying 60-80 m % of vegetable oil by a mixture consisting of 20-40 m % ethyl alcohol and 0.1-5 m % of methyl alcohol of the whole mass of the agent, then adding 5-30 m % agent by spraying through nozzles and water to a body of burnt lime in a reactor, and prior to adding the agent and water a mixture of 2-8 m % ethyl alcohol and 0.1-1 m % of methyl alcohol of the whole mass of the body of burnt lime is added by spraying through nozzles, while the mixture is agitating mechanically till a homogeneous mixture is prepared, then adding 40-65 m % water to the mixture, and ceasing mechanical agitating after commencement of the fierce chemical reaction.

5 Claims, 1 Drawing Sheet

(51) Int. Cl.
  *B01F 7/00* (2006.01)
  *B01F 7/18* (2006.01)
  *C04B 24/04* (2006.01)
  *C04B 7/00* (2006.01)
  *C04B 7/34* (2006.01)
  *C04B 28/00* (2006.01)
  *C04B 32/00* (2006.01)
  *C04B 103/65* (2006.01)

(56) References Cited

FOREIGN PATENT DOCUMENTS

| | | | | | |
|---|---|---|---|---|---|
| HU | 207694 | B | * | 5/1993 | ............... C04B 2/06 |
| HU | 213184 | B | * | 3/1997 | ......... C04B 40/0039 |
| HU | 223711 | B1 | * | 12/2004 | ............... C04B 2/06 |
| HU | 228662 | B1 | * | 5/2013 | ......... C04B 40/0046 |
| WO | WO-2008062018 | A1 | * | 5/2008 | ........... C04B 14/047 |

* cited by examiner

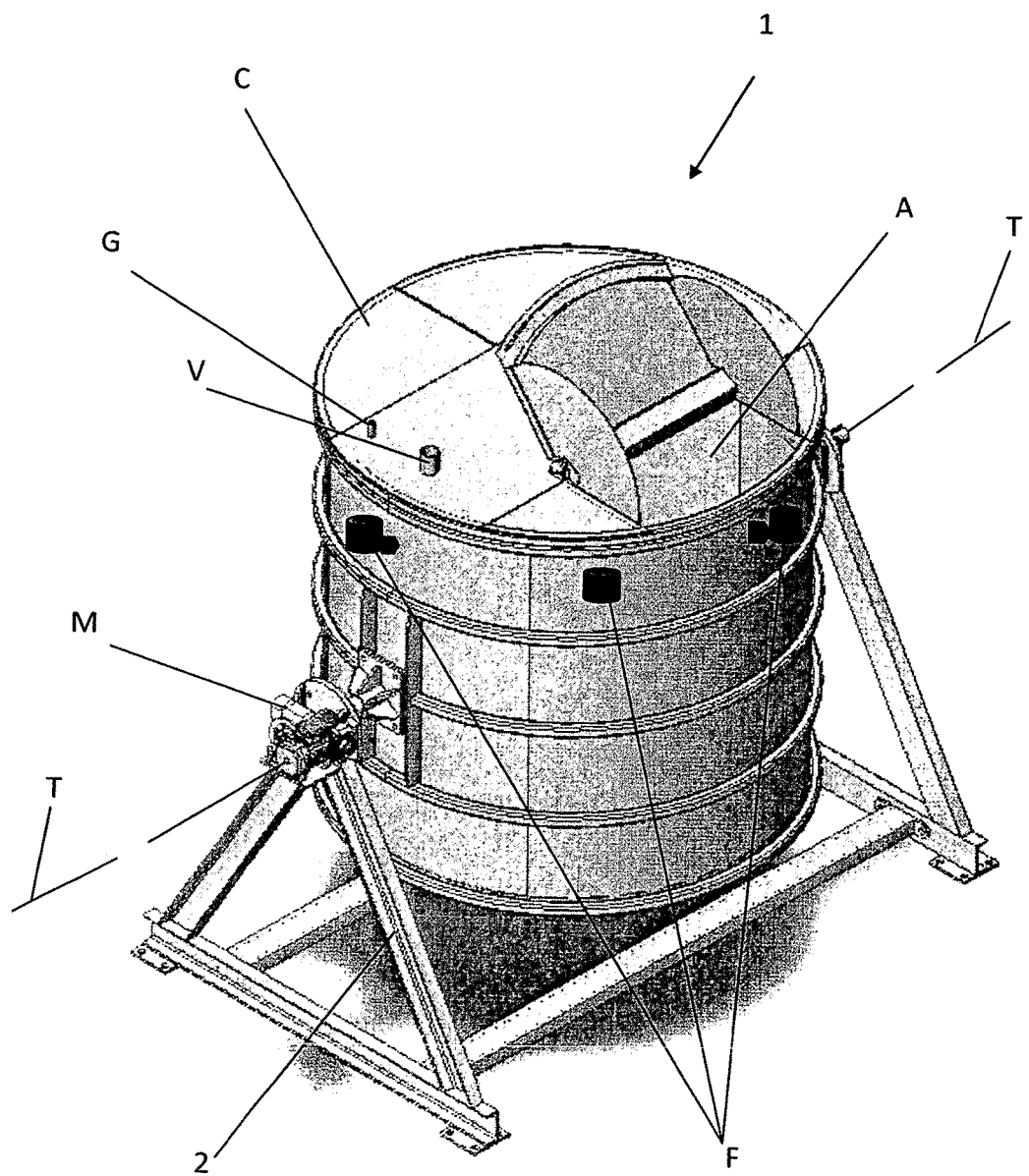

METHOD FOR PRODUCTION OF ADDITIVES ENHANCING WATER TIGHTNESS OF BUILDING MATERIALS

FIELD OF THE INVENTION

The invention relates to a method for producing an additive material enhancing water tightness of structural and binding building materials comprising the steps of: preparing a hydrophobizing agent by esterification of vegetable oil such that mixing 20 to 40% by weight of ethanol and 0.1-5 w % methanol with 60-80 w % of a vegetable oil counted per total mass of the hydrophobizing agent; and adding hydrophobizing agent and water to quicklime, and additive material enhancing water tightness of structural and binding building materials consisting of hydrated lime treated with hydrophobizing agent. The invention also relates to a mixing device for producing additive material enhancing water tightness of structural and binding building materials, the device having a vessel suspended on a leg and tiltable around an axis and a charge/discharge port is provided on the vessel.

BACKGROUND ART

An often absolutely essential feature of various mixtures like mortars, binders, glues, cements, etc, used in the construction industry is their waterproof property or water tightness. If such a mixture does not provide the water tightness property in itself, sealing feature of a structure should be made by using various additional solutions. However, these solutions require much work, and are cost-intensive, and usually do not lead to the correct result due to construction or material defects.

For this, several attempts are known in the art to make those mixtures have themselves water tight properties.

Such a solution is disclosed by patent document HU 204076 which describes a water-resistant adhesive mixture, and wherein a Na-bentonite (montmorillonite) as moisture-sealing agent, an inorganic base and a hydroxycarboxylic acid are mixed into the binder.

Patent document CN1068803 discloses a water-resistant cement, wherein the water-tightness is intended to achieve by mixing bentonite, gypsum, coal ash and calcium ligninsulfonate to cement clinker.

Common disadvantage of solutions applying bentonite is that moisture bound by added bentonite to achieve water tightness diffuses towards surfaces of a construed structure in dry weather conditions, where later causes wetting and damp.

Another solution is presented in patent JP 7907439 wherein a water tightness is achieved by adding organic polymers, namely methacrylate copolymers. This is really an excellent solution for achieving water-tightness, but it is extremely expensive.

Patent document HU 223 711 also proposes the use of organic materials, substantially oil and other organic acids together with indirect materials mixed to quicklime, such as ethyl and methyl alcohol and benzine, a ratio of the latter may reach 4% by volume, and therefore the production and use of this material is rather dangerous.

Patent document HU 207 694 discloses a method for producing a hydrophobic lime powder by emulsifying 1-5 parts by volume of a solvent such as denatured alcohol and 1-3 parts by volume of linseed oil, and then 1-6 parts by volume of emulsion is added to 10 parts by volume of lime and the resulting mixture was dried and pulverized. However, pulverized additive can be produced by this process exclusively if the finished mixture is dried and crushed into powder. Lime must be mechanically pulverized and ground beforehand or during the process, that is the production time of a batch of such additive thus produced is long with considerable costs incurred for drying and pulverizing operations.

According to a process described in the patent document HU 213 184 burnt lime, oil, alcohol and water are mixed together at the same time, in suitable proportions, and the mixture is ground. Since the unesterified oil is not soluble in alcoholic water, but forms a separate phase, this method is actually infeasible.

According to another process described in the patent application US 2007/0175366 3-8 wt % vegetable oil, a surfactant of 0.15 to 3.5 wt % and up to 100 wt % of powdered quicklime are mixed, wherein the surfactant is a cleansing agent obtained by alcoholic extraction, or e.g. a potash soap. The surfactant is emulsified in the oil, and then the emulsion is sprayed into the lime by constant stirring, then adding 40 to 80% of water to the mixture and allowed to dry at room temperature. As a result of the addition of much greater amount of water than would be required by the stoichiometric ratio drying takes a long time. Furthermore, the more water is added to the mixture, the particle size of the finished product will be larger, perhaps a portion of the excess water not to vaporize, which increases the specific weight of the product and requires a subsequent and costly drying.

The described additives also have the disadvantage that the their specific weight equal to or greater than 800 kg/m$^3$, thus significantly contribute to the mass of the structures construed, as well as handling, transport and packaging of such additives is also very inconvenient.

Therefore, the object of the invention is to provide a powdered additive material for structural and binder materials used in building industry, such as adhesives, mortars, plaster materials, cements, etc., which excludes the moisture from the structure rather than binding it, as well as cheap to produce, has a low specific weight, and its use is harmless both to the environment and the user A further object is that the additives of the present invention be chemically stable, and can be durably colored in itself.

Another object of the invention is to develop a method and apparatus by which the additive according to the invention can be produced simply and cheaply without a need of subsequent drying and pulverizing.

DISCLOSURE OF THE INVENTION

Above objects have been achieved by providing a method for producing additive material enhancing water tightness of structural and binding building materials comprising the steps of: preparing a hydrophobizing agent by esterification of vegetable oil such that mixing 20 to 40% by weight of ethanol and 0.1-5 w % methanol with 60-80 w % of a vegetable oil counted per total mass of the hydrophobizing agent; and adding hydrophobizing agent and water to quicklime, and prior to adding of said hydrophobizing agent, adding a mixture of 2-8 w % of ethanol and 0.1-1 w % of methanol, counted per mass of the quicklime, by spraying through jet nozzle to the quicklime; then adding 5-30 w % of said hydrophobizing agent by spraying through jet nozzle to the quicklime, whereby the mixture is mechanically mixed until a homogeneous mixture was prepared, and then adding water 40 to 65 w % to the mixture, and breaking the mechanical mixing when a vigorous chemical reaction getting started.

Esterifying of sunflower oil, rapeseed oil, or any mixture thereof.

Preferably, making the hydrophobizing agent from 60-68 w % vegetable oil and 28-38 w % ethanol and 0.2-4 w % methanol.

Adding the hydrophobizing agent to the quicklime by 8 to 14 w % of the quicklime.

Making powdered additive material having an average particle size between 4 and 5 microns.

Coloring the additive material by conventional pigment.

Our aim is also achieved by providing an additive material enhancing water tightness of structural and binding building materials consisting of hydrated lime treated with hydrophobizing agent, and said hydrophobizing agent comprises estherified vegetable oil, the ratio of vegetable oil in hydrophobizing agent is 60-80 w %; further contains 20-40 w % ethyl alcohol and 0.1 to 5% methyl alcohol, and the ratio of hydrophobizing agent in the additive material is between 5-30 w %.

The vegetable oil is selected from the group containing sunflower oil, rapeseed oil or any mixture thereof.

The vegetable oil is selected from the group containing cold pressed sunflower oil and rapeseed oil or any mixture thereof.

The additive material has a form of powder and having an average particle size of 4-5 microns.

That the additive has a specific weight of 360 kg/m$^3$ to 390 kg/m$^3$.

Measured compaction of the additive material is 4 to 5% by volume.

Furthermore, a powder mixing device is also provided for producing additive material enhancing water tightness of structural and binding building materials, the device having a vessel suspended on a leg and tiltable around an axis and a charge/discharge port is provided on the vessel, an electric drive connected to a mixing blade arranged inside the vessel is mounted on the bottom of the vessel, and an opening for discharging steam is formed on the vessel, and in the top part of the vessel equally spaced apart nozzles opening into the interior of the vessel are circumferentially arranged.

The invention will be described in details by showing its preferred embodiments referring to the drawings as attached, where FIG. 1 is a perspective view of the powder mixing device according to the invention.

DETAILED DESCRIPTION OF THE INVENTION

Preparation of an additive material according to the invention is based on recognition that the burnt lime, as a conventional component of mortars in building industry the binding process of which takes place at the effect of the carbon dioxide in the air while forming $CaCO_3$, can be mixed with an agent hydrophobic in itself by the use of a hydrophobic additive having low relative density. According to our researches the proper additives are vegetable oils such as sunflower oil, rapeseed oil, palm oil, etc.

However, mixtures of vegetable oils and CaO and water form coarse dispersed systems not suitable for use in construction. Since the vegetable oils are fatty acid esters of glycerol, and the glycerol (or glycerin) is an alcohol containing three hydroxide groups, that is it is a tri-ol, in the fatty acid esters, in most cases, one fatty acid molecule blocks all three hydroxide groups of the glycerol, and properties of a glycerol ester is determined by the saturation and chain length of acids. Therefore, transformation (interesterification) of vegetable oils and fats by alcoholysis (transesterification) is a suitable means for improving the quality of flow and therefore also of dispersion properties of viscous vegetable oils and fats the of the dispersion.

It has been found therefore that by means of alcoholic, preferably ethylenic and/or methylenic transesterification of said oils and then slaking the burnt lime added with transesterified oleic acids, a powdered additive material is obtained, which can be used more preferably in a wide range of constructional mortars due to its small particle size, favorable pH, highly preferred specific gravity, excellent water-repellent properties, it's very finely dispersed fraction and durable dyeability, than all known additive materials, since it does not impair their binding properties, while maintaining such favourable features like excellent water tightness and dyeability and perfectly miscible in these mortars in a homogeneous way.

We have also discovered that the higher the ratio of unsaturated fatty acids in the raw material, the better the quality of resulting additive material. Especially cold-pressed vegetable oils meet this requirement.

Additive material according to the present invention is produced by a hydrophobic agent consisting of transesterified vegetable oil, the composition of which (mass %, hereinafter referred to as wt %):

Vegetable oil 60 to 80 wt %,
Ethyl alcohol 20 to 40 wt %
Methyl alcohol 0.1-5 wt %.

Additive material according to the present invention can be prepared by a method according to the present invention using a powder mixing apparatus 1 consisting of a stationary drum or vessel C developed by the applicant. During the procedure CaO (quicklime) base material is charged into the drum of the powder mixing apparatus 1. Adding a mixture of 2-8 w % of ethanol and 0.1-1 w % of methanol to the quicklime, counted per mass of the quicklime, while the powder mixer apparatus 1 is in continuous operation. The alcohol mixture is supplied to the burnt lime by fine spraying. Alcohol decreases the value of surface tension of the burnt lime; the quicklime lumps disintegrate by this effect, thus contributing to increase the surface available for the reaction.

Thereafter, the above-described hydrophobic agent is also introduced into the powder mixing apparatus 1 also by spraying. The amount of the hydrophobic agent is 5-30%, preferably 8-10% by weight of the amount of burnt lime base material. After the admixture is homogeneously mixed, water is added in a short time (a few seconds), which is 30 to 65 w % of the of burnt lime raw material. Based on the molar ratios for the reaction the amount of water theoretically required:

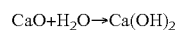

56 g/mol+18 g/mol→74 g/mol 75.6 wt % lime, and 24.4 wt % water, i.e. 32.2% of water is needed based on the mass of the burnt lime, but the lower limit of 30 wt % can be accounted for any contamination of the quicklime as well as the amount of hydrophobic agent, while a quantity of water supplied in excess can be explained by the optional need of reducing the temperature possibly affecting negatively to the structure of the powder mixing apparatus 1. The more water is added, the smaller the thermal stress applied to the powder mixing apparatus 1 would be, however, the particle size of the finished product would be higher, possibly a portion of the excess water does not vaporize, which latter increases the specific gravity of the finished product, and a subsequent—and costly—drying procedure would be required. Consequently, the appropriate amount of water is 30-40 wt % of mass of the quicklime.

After a violent chemical reaction started, the powder mixing apparatus 1 is stopped. Formation of hydrate of lime takes place within 2 minutes at a temperature between 100-200° C. (depending on the amount of water fed in excess and must be evaporated) and the excess water is removed as steam. When the reaction is calmed down, the powder mixing apparatus 1 is operated for a short time, and then 1 minute shutdown occurs. The finished hydrophobic additive material is discharged to a vessel. By 16-24 hours of rest, after cooling, the additive material powder can be used.

Properties of the additive material made according to this invention are preferably as follow:

PH 7-7.5 pH
Specific gravity from 360 to 390 kg/m$^3$
Compaction 4-5%
Particle size: 4-5 microns
Color: white.

For making colored additive material according to the invention about 1% conventional pigment is to be admixed with the water.

FIG. 1 is a perspective view of the powder mixing apparatus 1 according to the invention. Vessel C of the apparatus 1 is suspended on a foot 2 such that it is tiltable around an axis T as required by the need of feeding and discharge for example by means of a tipper motor M. A closeable feeding/dispensing opening A is formed on the vessel C, through which the materials required for achieving the process according to the invention can be delivered into the vessel C. On the bottom not shown in the FIGURE an electrically driven gear is mounted to rotate a mixing blade arranged inside the vessel C. Next to the opening A further opening G for venting steam formed by the process and an opening V for introducing water are arranged. Circumferentially on the upper part of the vessel C equally spaced nozzles F are incorporated. The mixture of ethyl alcohol and methyl alcohol as well as the hydrophobic agent can be sprayed through theses spraying nozzles F into the interior of vessel C. By the use of the apparatus 1 the sprayed in ethyl alcohol and methyl alcohol mixture as well as the hydrophobic agent are perfectly miscible with the burnt lime, in contrast to the rotary equipment conventionally used where the mixture of hydrophobic additive and the burnt lime generally adheres to the drum's wall, thereby an uneven mixing takes place, and only a portion of the materials are involved in the reactions.

Example 1

40 kg of CaO as base material is fed into the vessel C of a powder mixing apparatus 1, which is about 45 wt % of the ingredients used in the procedure. During operation of powder mixing device 1 that is by continuous mixing operation, a mixture of 2 wt % ethyl alcohol and 0.1 wt % methyl alcohol of the total mass of the quicklime fed was sprayed by nozzles F into the vessel C. Then, a hydrophobic agent is introduced into the vessel C also by fine spraying, which includes 12 wt % of the ingredients used in the process and having a composition as follows:

60 wt % sunflower oil,
39.9 wt % of ethyl alcohol,
Methanol 0.1 wt %.

After the admixtures have been homogeneously mixed 46 liters of water (instead of approx. 13 l) was added with stirring over a 2 to 3 sec, which includes about 52 wt % of the entire content of the vessel C (that is in a large stoichiometric excess). After the chemical reaction was started, the apparatus 1 is stopped. The forming reaction of hydrated lime took place at 100° C. about within 2 minutes, a portion of the excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:

pH 9
A specific gravity: 430 kg/m3
7% compaction
Particle size: 7 microns
Color: yellowish white.

Example 2

40 kg of CaO as base material is fed into the vessel C of a powder mixing apparatus 1, which is about 45 wt % of the ingredients used in the procedure. During operation of powder mixing device 1 that is by continuous mixing operation, a mixture of 3 wt % ethyl alcohol and 0.2 wt % methyl alcohol of the total mass of the quicklime fed was sprayed by nozzles F into the vessel C. Then, a hydrophobic agent is introduced into the vessel C also by fine spraying, which includes 8 wt % of the ingredients used in the process and having a composition as follows:

60 wt % sunflower oil,
38 wt % of ethyl alcohol,
methanol 2 wt %.

After the admixtures have been homogeneously mixed 12 liters of water was added with stirring over a 2 to 3 sec, which includes about 26 wt % of the entire content of the vessel C (that is fewer than stoichiometric ratio). After the fierce chemical reaction was started, the apparatus 1 is stopped. The forming reaction of hydrated lime took place at 190° C. about within 1 minutes, a small portion of the water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:

pH 8
A specific gravity: 440 kg/m3
8% compaction
Particle size: 5 microns
Color: white.

Example 3

40 kg of CaO as base material is fed into the vessel C of a powder mixing apparatus 1, which is about 45 wt % of the ingredients used in the procedure. During operation of powder mixing device 1 that is by continuous mixing operation, a mixture of 4 wt % ethyl alcohol and 0.3 wt % methyl alcohol of the total mass of the quicklime fed was sprayed by nozzles F into the vessel C. Then, a hydrophobic agent is introduced into the vessel C also by fine spraying, which includes 6 wt % of the ingredients used in the process and having a composition as follows:
- 60 wt % sunflower oil,
- 38 wt % of ethyl alcohol,
- methanol 2 wt %.

After the admixtures have been homogeneously mixed 25 liters of water was added with stirring over a 2 to 3 sec, which includes about 35 wt % of the entire content of the vessel C (that is in more than stoichiometric). After the chemical reaction was started, the apparatus 1 is stopped. The forming reaction of hydrated lime took place at 150° C. about within 1 minutes, excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:
- pH 7
- A specific gravity: 390 kg/m3
- 7° A) compaction
- Particle size: 5 microns
- Color: white.

Example 4

40 kg of CaO as base material is fed into the vessel C of a powder mixing apparatus 1, which is about 45 wt % of the ingredients used in the procedure. During operation of powder mixing device 1 that is by continuous mixing operation, a mixture of 5 wt % ethyl alcohol and 0.5 wt % methyl alcohol of the total mass of the quicklime fed was sprayed by nozzles F into the vessel C. Then, a hydrophobic agent is introduced into the vessel C also by fine spraying, which includes 4 wt % of the ingredients used in the process and having a composition as follows:
- 57 wt % sunflower oil,
- 40 wt % of ethyl alcohol,
- methanol 3 wt %.

After the admixtures have been homogeneously mixed 25 liters of water was added with stirring over a 2 to 3 sec, which includes about 35 wt % of the entire content of the vessel C (that is more than stoichiometric). After the chemical reaction was started, the apparatus 1 is stopped. The forming reaction of hydrated lime took place at 140° C. about within 1 minutes; excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:
- pH 7
- A specific gravity: 360 kg/m3
- 4% compaction
- Particle size: 4 microns
- Color: snow-white.

Example 5

40 kg of CaO as base material is fed into the vessel C of a powder mixing apparatus 1, which is about 45 wt % of the ingredients used in the procedure. During operation of powder mixing device 1 that is by continuous mixing operation, a mixture of 6 wt % ethyl alcohol and 0.6 wt % methyl alcohol of the total mass of the quicklime fed was sprayed by nozzles F into the vessel C. Then, a hydrophobic agent is introduced into the vessel C also by fine spraying, which includes 6 wt % of the ingredients used in the process and having a composition as follows:
- 57 wt % sunflower oil,
- 38 wt % of ethyl alcohol,
- methanol 5 wt %.

After the admixtures have been homogeneously mixed 25 liters of water was added with stirring over a 2 to 3 sec, which includes about 35 wt % of the entire content of the vessel C (that is more than stoichiometric). After the chemical reaction was started, the apparatus 1 is stopped. The forming reaction of hydrated lime took place at 140° C. about within 1 minutes, a portion of the excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:
- pH 7.5
- A specific gravity: 480 kg/m3
- 5% compaction
- Particle size: 4 microns
- Color: white.

Example 6

40 kg of CaO as base material is fed into the vessel C of a powder mixing apparatus 1, which is about 45 wt % of the ingredients used in the procedure. During operation of powder mixing device 1 that is by continuous mixing operation, a mixture of 7 wt % ethyl alcohol and 0.7 wt % methyl alcohol of the total mass of the quicklime fed was sprayed by nozzles F into the vessel C. Then, a hydrophobic agent is introduced into the vessel C also by fine spraying, which includes 5 wt % of the ingredients used in the process and having a composition as follows:
- 57 wt % cold pressed sunflower oil,
- 40 wt % of ethyl alcohol,
- methanol 3 wt %.

After the admixtures have been homogeneously mixed 25 liters of water was added with stirring over a 2 to 3 sec, which includes about 35 wt % of the entire content of the vessel C (that is more than stoichiometric). After the chemical reaction was started, the apparatus 1 is stopped. The forming reaction of hydrated lime took place at 140° C. about within 1 minutes; excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:
- pH 7.5
- A specific gravity: 490 kg/m3
- 5% compaction
- Particle size: 5 microns
- Color: snow-white.

Example 7

40 kg of CaO as base material is fed into the vessel C of a powder mixing apparatus 1, which is about 45 wt % of the ingredients used in the procedure. During operation of powder mixing device 1 that is by continuous mixing operation, a mixture of 8 wt % ethyl alcohol and 1 wt % methyl alcohol of the total mass of the quicklime fed was sprayed by nozzles F into the vessel C. Then, a hydrophobic agent is introduced into the vessel C also by fine spraying, which includes 5 wt % of the ingredients used in the process and having a composition as follows:

50 wt % cold pressed rape-seed oil,
47 wt % of ethyl alcohol,
methanol 3 wt %.

After the admixtures have been homogeneously mixed 25 liters of water was added with stirring over a 2 to 3 sec, which includes about 35 wt % of the entire content of the vessel C (that is more than stoichiometric). After the chemical reaction was started, the apparatus 1 is stopped. The forming reaction of hydrated lime took place at 140° C. about within 1 minutes, a portion of the excess water vented in the form of steam. After the reaction calmed down a short stirring for 1 minute and a stop occurred. Then the vessel C is tilted around the axis T, the apparatus 1 was operated again and the finished hydrophobic additive material emptied into a storage tank. Following a 24-hour rest and after cooling the additive material showed the following properties:

pH 7.5
A specific gravity: 490 kg/m3
5% compaction
Particle size: 5 microns
Color: white.

By using additive materials prepared according to the Examples 1-7 concrete specimens were made and tested according to the standard EN 12390-8: 2001 on 5 bar pressure for 72 hours. Specimens were also prepared by adding tile adhesive and wall plaster as well.

Water penetration depth (watertight) of the concrete specimens treated with additive material according to Examples 2-7 met the requirements of HV3 (H) rating based on the standard, while a specimen treated by materials according to Example 1 has reached the rating HV-2 (H) as well. Cement-based wall-plasters and tile adhesives (colored or uncolored) treated by additive materials according to Examples 2-7 complete water tightness and excellent vapor diffusion effect and color retention were observed, particularly by additives made according to the Example 4.

We have also found that any mixture of sunflower oil and rapeseed oil can equally be used for producing additive materials according to the invention.

The additives according to the invention were tested in connection with adsorption of oil derivatives as well. Compared to adsorbents of the prior art we have found a specifically greater amount of oil adsorbed, particularly when using sunflower oil. Due to enormous specific surface of the additive resulting from its particle size of 4-5 microns, its extinguishing effect is remarkable, and doe to its low specific gravity it can preferably be used in dry-powder extinguishers, too.

The main advantage of the powdered additive material of the present invention to be used in construction and structural binders, such as adhesives, mortars, wall plaster materials and cements is that enhances water tightness of structural and binding building materials compared to the additives of the prior art by excluding the moisture from the structure rather than binding it, as well as cheap to produce, has a low specific weight, and its use is harmless both to the environment and the user. Moreover, the additives of the present invention are chemically stable, and can be durably colored in itself. The additive material according to the invention can be produced simply and cheaply by the method and apparatus according to the invention, without a need of subsequent drying and pulverizing.

The invention claimed is:

1. A method for producing additive material enhancing water tightness of structural and binding building materials comprising the steps of: preparing a hydrophobizing agent by esterification of vegetable oil such that mixing 20 to 28.9% by weight of ethanol and 0.1-5 w % methanol with 71-79.9 w % of a vegetable oil counted per total mass of the hydrophobizing agent; adding 5-30 w % of said hydrophobizing agent by spraying through jet nozzle to the quicklime, whereby the mixture is mechanically mixed until a homogeneous mixture was prepared, and then adding water 40 to 65 w % to the mixture, and breaking the mechanical mixing when a vigorous chemical reaction getting started, wherein prior to adding of said hydrophobizing agent, adding a mixture of 2-8 w % of ethanol and 0.1-1 w % of methanol, counted per mass of the quicklime, by fine spraying through jet nozzle to the quicklime, in order to decrease the value of surface tension of the burnt lime.

2. The method according to claim 1, characterized by esterifying of sunflower oil, rapeseed oil, or any mixture thereof.

3. The method according to claim 1, characterized by adding the hydrophobizing agent to the quicklime by 8 to 14 w % of the quicklime.

4. The method according to claim 1, characterized by making powdered additive material having an average particle size between 4 and 5 microns.

5. The method according to claim 1, characterized by coloring the additive material by conventional pigment.

* * * * *